United States Patent
Barwicz et al.

(10) Patent No.: US 9,885,835 B2
(45) Date of Patent: Feb. 6, 2018

(54) SINGLE-MODE POLYMER WAVEGUIDE CONNECTOR

(71) Applicant: INTERNATIONAL BUSINESS MACHINES CORPORATION, Armonk, NY (US)

(72) Inventors: Tymon Barwicz, Yorktown Heights, NY (US); Hidetoshi Numata, Kanagawa (JP); Yoichi Taira, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/132,871

(22) Filed: Apr. 19, 2016

(65) Prior Publication Data
US 2016/0377817 A1    Dec. 29, 2016

Related U.S. Application Data

(63) Continuation of application No. 14/749,207, filed on Jun. 24, 2015, now Pat. No. 9,417,404.

(51) Int. Cl.
*G02B 6/36*    (2006.01)
*G02B 6/30*    (2006.01)
(Continued)

(52) U.S. Cl.
CPC .............. *G02B 6/30* (2013.01); *B29C 65/02* (2013.01); *G02B 6/02033* (2013.01);
(Continued)

(58) Field of Classification Search
CPC ........ G02B 6/30; G02B 6/1221; G02B 6/262; G02B 6/02033; G02B 6/3838; G02B 6/3854; G02B 6/3861
(Continued)

(56) References Cited

U.S. PATENT DOCUMENTS 5,625,730 A * 4/1997 Ishikawa .................. G02B 6/30
                                                      385/49
7,133,592 B2    11/2006 Yasuda et al.
(Continued)

FOREIGN PATENT DOCUMENTS

JP    2005128407 A *    5/2005    ............... G02B 6/30
JP    5485116    6/2012

OTHER PUBLICATIONS

List of IBM Patents or Patent Applications Treated as Related dated Apr. 19, 2016, 2 pages.
List of IBM Patents or Patent Applications Treated as Related.

*Primary Examiner* — Jerry Blevins
(74) *Attorney, Agent, or Firm* — Tutunjian & Bitetto, P.C.; Vazken Alexanian

(57) ABSTRACT

Waveguide connectors and methods of forming the same include heating a polymer waveguide having one or more waveguide cores and alignment features to a first temperature. A ferrule having alignment features is heated to the first temperature, the ferrule having a different coefficient of thermal expansion from the polymer waveguide. The alignment features of the polymer waveguide align with the alignment features of the ferrule when the polymer waveguide and the ferrule are heated to the first temperature. The polymer waveguide is positioned on the ferrule without a waveguide backfilm. The alignment features of the polymer waveguide are bonded to the corresponding alignment features of the ferrule.

16 Claims, 3 Drawing Sheets

(51) Int. Cl.
*G02B 6/38* (2006.01)
*G02B 6/02* (2006.01)
*B29C 65/02* (2006.01)
*G02B 6/122* (2006.01)
*G02B 6/26* (2006.01)
*B29L 11/00* (2006.01)

(52) U.S. Cl.
CPC ........... *G02B 6/1221* (2013.01); *G02B 6/262* (2013.01); *G02B 6/3855* (2013.01); *G02B 6/3861* (2013.01); *G02B 6/3885* (2013.01); *B29L 2011/00* (2013.01); *G02B 6/3839* (2013.01)

(58) Field of Classification Search
USPC .............................. 385/49, 80; 156/60, 272.2
See application file for complete search history.

(56) References Cited

U.S. PATENT DOCUMENTS

| | | |
|---|---|---|
| 8,750,658 B2 | 6/2014 | Lee |
| 2003/0219212 A1* | 11/2003 | Kwon ................ G02B 6/12016 385/52 |
| 2012/0014649 A1* | 1/2012 | Duis ................... G02B 6/3652 385/65 |
| 2014/0061979 A1 | 3/2014 | Numata et al. |
| 2014/0321809 A1 | 10/2014 | Bowen et al. |

\* cited by examiner

SINGLE-MODE POLYMER WAVEGUIDE CONNECTOR

BACKGROUND

Technical Field

The present invention relates to optical waveguides and, more particularly, to a single-mode polymer waveguide connector.

Description of the Related Art

Waveguides are used to transport, e.g., optical signals over large distances with very low losses. Waveguides employ, e.g., a difference between a refractive index for an internal medium called "core" and an external medium called "clad". In the example of fiber optics, the transport medium "core" is made of a higher refractive index glass and the external medium "clad" is made of a lower refractive index glass. These two glass layers are surrounded by sheath, shielding, or air. When an optical signal in the inner core layer hits the boundary between core and clad, it is internally reflected instead of escaping from core layer. As a result, optical fibers can be used to transport very low-loss signals across long distances.

Optical fibers used for waveguides are thin, flexible, and frequently made of silica glass, but may also be made from, e.g., fluoride glass, phosphate glass, chalcogenide glass, or crystal materials such as sapphire. Appropriate materials are selected in accordance with desired refractive properties. Transmissions over optical fiber suffer from less loss and electromagnetic interference relative to metal wires. In addition, since information propagates through optical fibers at the speed of light, latency is decreased over large distances using optical communications. Some fibers support many transverse transmission modes and are called multi-mode fibers, whereas others support a single mode and are called single-mode fibers. Single-mode fibers are frequently used for long-distance links, as multi-mode fibers are susceptible to modal dispersion over long distances due to slightly different transmission speeds between the different modes.

Polymer materials exhibit favorable properties for use in optical waveguides. Polymers provide good optical properties and are cost effective and easy to fabricate. Polymers are furthermore compatible with printed circuit board manufacturing processes due to a resilience against solder reflow and lamination processes, such that polymer structures can be formed directly on printed circuit boards alongside semiconductor-based components. Polymer waveguides are used for high-density optical interconnects in fiber-optic communications, optronics, and other light-based technologies. Waveguide connectors are used to connect between separate polymer waveguides and between polymer waveguides and glass fibers.

Existing polymer waveguide connectors are difficult to install under precise positioning requirements. One such connector is the polymer mechanical transfer (PMT) connector which is used as a multimode polymer waveguide connector. These connectors are difficult to assemble with positioning errors of under a few micrometers and are simply not feasible for positioning errors of less than a micrometer. Positioning errors can lead to loss of signal from, e.g., reflections that occur at imperfect junctions.

Although efforts have been made to improve positioning for polymer waveguide connectors, difficulties arise in fabrication. The initial positioning error of, e.g., a positioning groove on a waveguide may be under a micrometer due to precise lithography fabrication, but the polymers use generally have high coefficients of thermal expansion (CTEs), which causes the polymer to shrink or expand as the temperature changes.

SUMMARY

A method for assembling a waveguide connector includes heating a polymer waveguide having one or more waveguide cores and alignment features to a first temperature. A ferrule having alignment features is heated to the first temperature, the ferrule having a different coefficient of thermal expansion from the polymer waveguide. The alignment features of the polymer waveguide align with the alignment features of the ferrule when the polymer waveguide and the ferrule are heated to the first temperature. The polymer waveguide is positioned on the ferrule without a waveguide backfilm. The alignment features of the polymer waveguide are bonded to the corresponding alignment features of the ferrule.

A method for assembling a waveguide connector includes heating a polymer waveguide comprising one or more waveguide cores, alignment grooves, one or more topclad portions, and an underclad portion that is thicker than the one or more topclad portions, to a first temperature. A ferrule comprising alignment studs is heated to the first temperature, the ferrule having a different coefficient of thermal expansion from the polymer waveguide. The alignment grooves of the polymer waveguide align with the alignment studs of the ferrule when the polymer waveguide and the ferrule are heated to the first temperature. The polymer waveguide is positioned on the ferrule without a waveguide backfilm. The alignment features of the polymer waveguide are bonded to the corresponding alignment features of the ferrule while applying pressure on the polymer waveguide with a lid positioned directly on the polymer waveguide.

A waveguide connector includes a ferrule comprising first alignment features and a polymer waveguide lacking a backfilm. The polymer waveguide includes one or more a topclad portions, each comprising a waveguide core, second alignment features fastened to the first alignment features, and an underclad portion that is thicker than the one or more topclad portions. The polymer waveguide has a higher coefficient of thermal expansion of the ferrule and is fastened to the ferrule under tension These and other features and advantages will become apparent from the following detailed description of illustrative embodiments thereof, which is to be read in connection with the accompanying drawings.

DETAILED DESCRIPTION

Embodiments of the present invention provide polymer waveguides with precise positioning, having positioning errors below one micrometer. To accomplish this, the differing coefficients of thermal expansion (CTEs) of a waveguide material and a ferrule material are exploited by heating the two structures until they align, fastening the structures together, and letting them cool, thereby creating a tension in the polymer waveguide that precisely aligns the individual waveguides in the ferrule. By increasing the thickness of the bottom cladding of the polymer waveguide and by removing the backfilm that is normally used for support and positioning, the waveguide positioning may be made more consistent.

The functioning of a waveguide relies on total internal reflection of light—or other electromagnetic radiation—at a boundary. Waveguides at optical frequencies often take advantage of a difference in refractive index between two materials at the boundary. Fiber can be multi-mode or single-mode, referring to the propagation modes of the light as it passes through the waveguide. In the case of multi-mode fibers, multiple different transverse modes (i.e., multiple different light paths through the waveguide) can exist simultaneously in the relatively large waveguide core, where the core has a diameter that is much larger than the wavelength of the light carried. By contrast, in a single-mode fiber, only one transverse mode, called a zeroth mode or a fundamental mode, exists. This advantageously inhibits modal dispersion and provides superior fidelity of signals over long distances. In a single-mode fiber, a wavelength division multiplex (WDM) technology is often used for a broadband communication. When WDM is applied, multiple different frequencies of light are transmitted along one single-mode fiber, each propagating along the fiber in the fundamental mode. When dealing with single-mode optical fiber, an intuitive geometric interpretation for the propagation of light within the fiber is unavailable, with the behavior of the propagation being modeled instead using the Helmholtz equation.

Figure 1:
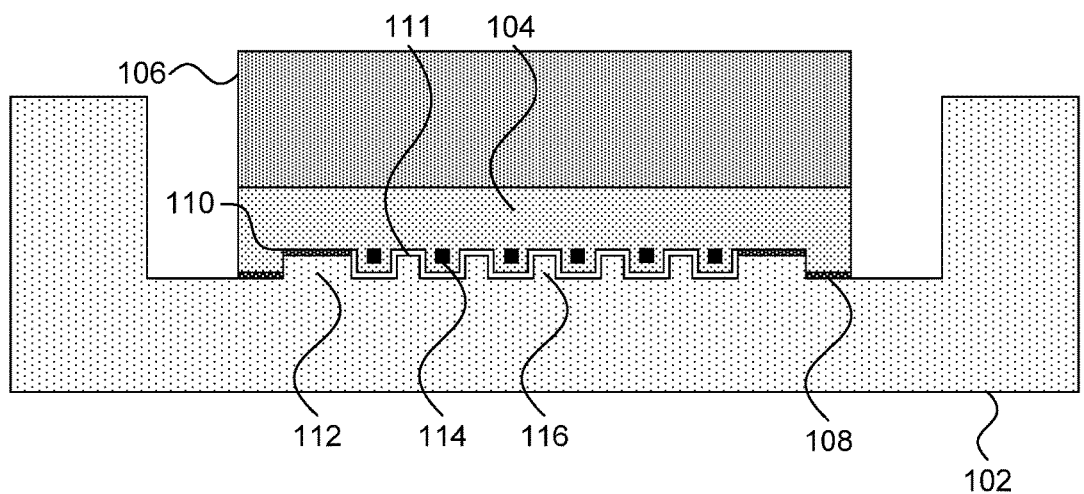
FIG. 1 is a cross-sectional diagram of a waveguide connector in accordance with the present principles.

Referring now to the drawings in which like numerals represent the same or similar elements and initially to FIG. 1, the placement of a polymer waveguide 104 on a ferrule 102 is shown. A lid 106 is used to place and hold the waveguide 104. It is contemplated that the waveguide 104 may have an exemplary CTE of about 50 ppm/° C., while the ferrule 102 may have an exemplary CTE of about 1 ppm/° C. The waveguide 104 includes a set of waveguide cores 114, a set of narrow grooves 111 between cores, and two wide grooves 110 on both sides of the core array. The ferrule 102 includes two wide studs 112 and a set of narrow studs 116. At room temperature (e.g., 25° C.), if the distance between the two grooves 110 is about 3 mm, this distance would be an exemplary 3 µm smaller than the distance between the two studs 112 at room temperature. At a temperature of 45° C., however, the differing CTEs of the two structures results in the grooves 110 aligning with the studs 112, with the waveguide cores 114 also aligning with the narrow studs 116. It is specifically contemplated that the ferrule 102 may be part of, e.g., a mechanical transfer (MT) connector, but any appropriate connector may be used instead.

Optical connectors terminate an end of the optical fiber and provide for rapid connection and disconnection. By aligning the fibers of two sections of optical cable, the connectors ensure an easy connection and allow light to pass with little loss. Ideally the connectors have some form of locking ability that maintains a strong connection and prevents fibers in respective connectors from moving relative to one another. Maintaining good alignment is important for minimizing return loss, which occurs at discontinuities in the connection. Even small deviations in positioning and alignment can create significant return losses. The present embodiments bring cores 114 of respective connectors into alignment with very low deviation from the expected positions.

The MT connector is a multi-fiber connector that is often used for ribbon cables. It is used in, for example, preterminated cable assemblies and cabling systems. In particular, the MT connector allows multiple single-mode fibers to connected in parallel, such that one fiber ribbon cable will include multiple glass fibers and thereby provide increased transmission bandwidth. Connection strength is provided by latches on the connector that lock into place on a mated plug using a spring mechanism. Guide pins are used to aid in alignment of the ferrules 102 and removable housings may be employed for modularity. While this provides good mechanical alignment between two respective connectors, manufacturing imperfections can still result in misalignment between the small waveguide cores.

The polymer waveguide 104 is formed by forming waveguide cores on a lower refractive index under cladding polymer layer. The cores are formed by depositing, e.g., a higher refractive index polymer material using a photo lithography method or any other appropriate deposition method and patterning the core material to form waveguides of the desired shape. A lower index upper cladding polymer material is then deposited over the cores. The optical signal is confined by internal reflection to the waveguide core material at the interface between the waveguide core and the upper and lower cladding material. Single-mode glass fibers often have core diameters from about 5 to about 11 µm. The corresponding single-mode polymer waveguides also have a few cross sectional area of a few micrometers.

During placement, the waveguide 104 is heated to a temperature that causes an expansion of the waveguide 104, allowing it to align with the studs 116 and 112 of the ferrule 102 as described above. A glue 108 is applied to respective grooves 110 of the waveguide 104 and studs 112 of the ferrule 102. The glue 108 may be, e.g., an ultraviolet-cured glue that is then exposed to ultraviolet light, locking the sides of the waveguide 104 in place. Although it is specifically contemplated that a glue may be used, any other appropriate form of bonding may be employed instead. As the waveguide 104 cools, the waveguide 104 is prevented from shrinking accordingly and a tension is created within the waveguide 104 that pulls the polymer waveguide 104 flat and brings each waveguide core 114 into a precise position within the narrow studs 116.

Figure 3:
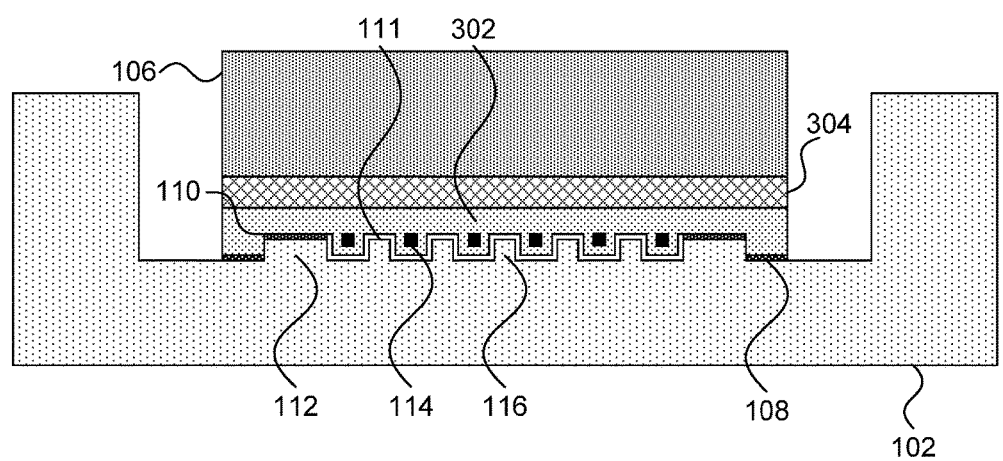
FIG. 3 is a cross-sectional diagram of a conventional waveguide connector.

Referring now to FIG. 3, a cross-sectional diagram of a conventional connector with a backfilm and a thin underclad layer is shown. In conventional connector construction, a hard back film is used on a relatively thin polymer waveguide. The hard back film 304 is glued to a thinner waveguide 302. The soft waveguide layer 302 and glue layer are then sandwiched between the hard back film 304 and studs of the ferrule 112/116, causing these layers to buckle and become distorted upon cooling. Binding the waveguide material to the backfilm causes the CTE difference between those structures to create distortions and misalignment of waveguide cores in the material.

To address this, the present embodiments omit the back film entirely and instead increase a thickness of the waveguide 104. The thicker waveguide 104 provides structure and consistency in CTE. A glass lid 106 is then applied directly to the waveguide 104 to apply pressure while the ultraviolet glue 108 sets. The thickness of the underclad portion of the waveguide 104 may be, for example, about 50 µm—increased relative to conventional waveguides which have the underclad portion with a thickness of about 20 µm.

This thickness provides stability of a precise core position during assembly, easy manipulation of the waveguide 104, and increased physical strength of the waveguide 104 after assembly. In one exemplary embodiment, the underclad portion of the waveguide 104 has a thickness of about 50 μm while the topclad portion that includes waveguide cores 114 has a thickness of about 23 to 24 μm. In this exemplary embodiment, a spacing between cores 114 is about 250 μm.

Omitting the back film and using a waveguide 104 provides superior alignment of the waveguide cores 114, with experimentally demonstrated positioning errors of less than 1 μm. Improvements are shown in height, lateral, and absolute misalignment values. The thickness of the waveguide 104 does not decrease the CTE of the material, which is used to provide precise alignment of the waveguide cores 114.

Figure 2:
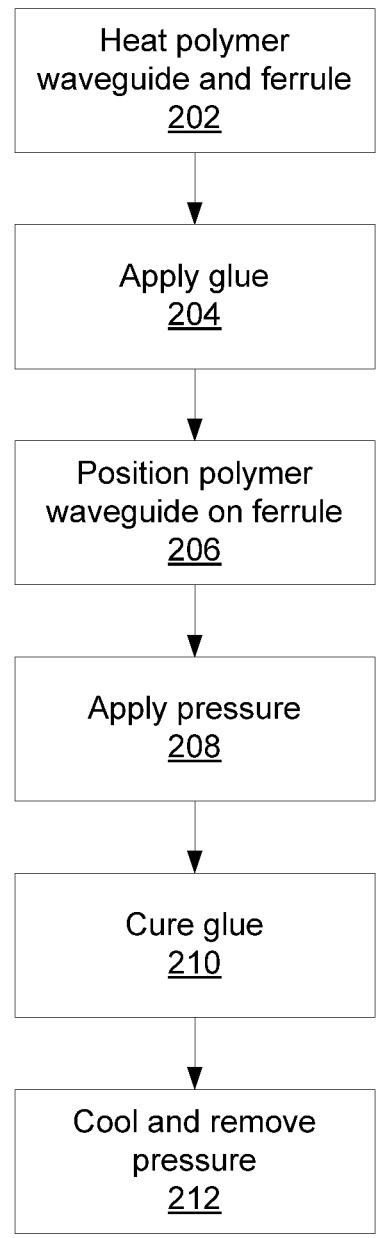
FIG. 2 is a block/flow diagram of a method of forming a waveguide connector in accordance with the present principles.

Referring now to FIG. 2, a method for constructing a connector is shown. Block 202 heats the polymer waveguide 104 and the ferrule 102 until the grooves 110 align with studs 112. As noted above, the polymer waveguide 104 starts with, e.g., a smaller width between grooves 110 than the width between the studs 112 of the ferrule 102. Due to CTE mismatch between the materials of the polymer waveguide 104 and the ferrule 102, the polymer waveguide 104 will expand at a different rate per degree of temperature change, such that at some temperature the widths will be equal. Block 204 applies, e.g., an ultraviolet curing glue 108 to the grooves 110 and/or the studs 112 and block 206 positions the polymer waveguide 104 on the ferrule 102, aligning the grooves 110 and the studs 112.

Block 208 applies pressure to the polymer waveguide 104 using, e.g., the glass lid 106. Block 210 cures the glue by applying, e.g., ultraviolet light. This locks the grooves 110 and the studs 112 together. Block 212 then removes the pressure from the polymer waveguide 104 and allows the polymer waveguide 104 and the ferrule 102 to cool. As they cool, the polymer waveguide 104 attempts to contract more quickly than the ferrule 102, creating a tension within the material of the polymer waveguide 104. This tension pulls the cores 114 precisely into position.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an 4embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a single-mode polymer waveguide connector (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for assembling a waveguide connector, comprising:
   heating a polymer waveguide comprising one or more waveguide cores and alignment features to a first temperature;
   heating a ferrule, the ferrule comprising alignment features and waveguide grooves that have a shape that matches a shape of the one or more waveguide cores, to the first temperature, the ferrule having a different coefficient of thermal expansion from the polymer waveguide, wherein the alignment features of the polymer waveguide align with the alignment features of the ferrule when the polymer waveguide and the ferrule are heated to the first temperature;
   positioning the polymer waveguide on the ferrule without a waveguide backfilm such that the one or more waveguide cores are positioned within the waveguide grooves; and
   bonding the alignment features of the polymer waveguide to the corresponding alignment features of the ferrule.

2. The method of claim 1, wherein the polymer waveguide has an underclad portion that is thicker than one or more topclad portions.

3. The method of claim 2, wherein the underclad portion has a thickness of about 50 μm and the one or more topclad portions have a thickness of about 23 to 24 μm.

4. The method of claim 1, wherein bonding comprises applying pressure on the polymer waveguide with a lid positioned directly on the polymer waveguide.

5. The method of claim 1, wherein the polymer waveguide has a higher coefficient of thermal expansion than the ferrule.

6. The method of claim 1, wherein bonding comprises applying glue to the alignment features of at least one of the polymer waveguide and the ferrule.

7. The method of claim 6, wherein bonding further comprises applying a ultraviolet curing glue and applying ultraviolet light to the ultraviolet curing glue.

8. The method of claim 1, wherein the alignment features of the polymer waveguide comprise grooves and the corresponding alignment features of the ferrule comprise studs configured to couple with the grooves of the polymer waveguide.

9. A method for assembling a waveguide connector, comprising:
   heating a polymer waveguide comprising one or more waveguide cores, alignment grooves, one or more topclad portions, and an underclad portion that is thicker than the one or more topclad portions, to a first temperature;

heating a ferrule, the ferrule comprising alignment studs and waveguide grooves that have a shape that matches a shape of the one or more waveguide cores, to the first temperature, the ferrule having a different coefficient of thermal expansion from the polymer waveguide, wherein the alignment grooves of the polymer waveguide align with the alignment studs of the ferrule when the polymer waveguide and the ferrule are heated to the first temperature;

positioning the polymer waveguide on the ferrule without a waveguide backfilm such that the one or more waveguide cores are positioned within the waveguide grooves; and bonding the alignment grooves of the polymer waveguide to the corresponding alignment studs of the ferrule while applying pressure on the polymer waveguide with a lid positioned directly on the polymer waveguide.

10. The method of claim 9, wherein the underclad portion has a thickness of about 50 μm and the one or more topclad portions have a thickness of about 23 to 24 μm.

11. The method of claim 9, wherein the polymer waveguide has a higher coefficient of thermal expansion than the ferrule.

12. The method of claim 9, wherein bonding comprises applying glue to at least one of the alignment grooves of the polymer waveguide and the alignment studs of the ferrule.

13. The method of claim 12, wherein bonding further comprises applying a ultraviolet curing glue and applying ultraviolet light to the ultraviolet curing glue.

14. A waveguide connector comprising:
a ferrule comprising waveguide grooves and first alignment features;
a polymer waveguide lacking a backfilm, comprising:
one or more a topclad portions, each comprising a waveguide core positioned within a respective waveguide groove, wherein the waveguide groove has a shape that matches a shape of the respective waveguide core;
second alignment features fastened to the first alignment features; and
an underclad portion that is thicker than the one or more topclad portions,
wherein the polymer waveguide has a higher coefficient of thermal expansion of the ferrule and is fastened to the ferrule under tension.

15. The waveguide connector of claim 14, wherein the underclad portion has a thickness of about 50 μm and the one or more topclad portions have a thickness of about 23 to 24 μm.

16. The waveguide connector of claim 14, wherein the first alignment features comprise ferrule studs and the second alignment features comprise waveguide grooves.

* * * * *